United States Patent
Wang et al.

(10) Patent No.: US 10,071,933 B2
(45) Date of Patent: Sep. 11, 2018

(54) CHEMICALLY TOUGHENED FLEXIBLE ULTRATHIN GLASS

(71) Applicant: SCHOTT Glass Technologies (Suzhou) Co. Ltd., Suzhou New District (CN)

(72) Inventors: Xi Wang, Su Zhou (CN); Feng He, Su Zhou (CN); Jose Zimmer, Losheim am See (DE)

(73) Assignee: SCHOTT GLASS TECHNOLOGIES (SUZHOU) CO. LTD., Suzhou New District (CN)

( * ) Notice: Subject to any disclaimer, the term of this patent is extended or adjusted under 35 U.S.C. 154(b) by 363 days.

(21) Appl. No.: 14/854,432

(22) Filed: Sep. 15, 2015

(65) Prior Publication Data
US 2016/0002103 A1 Jan. 7, 2016

Related U.S. Application Data

(63) Continuation of application No. PCT/CN2013/072695, filed on Mar. 15, 2013.

(51) Int. Cl.
*C03C 21/00* (2006.01)
*C03C 15/00* (2006.01)
(Continued)

(52) U.S. Cl.
CPC .......... *C03C 21/00* (2013.01); *B23K 26/0624* (2015.10); *B32B 17/064* (2013.01); *C03B 17/06* (2013.01); *C03B 33/091* (2013.01); *C03C 3/091* (2013.01); *C03C 3/093* (2013.01); *C03C 15/00* (2013.01); *C03C 21/002* (2013.01);
(Continued)

(58) Field of Classification Search
None
See application file for complete search history.

(56) References Cited

U.S. PATENT DOCUMENTS 4,156,755 A * 5/1979 Rinehart ................. C03C 3/083
428/410
6,092,392 A * 7/2000 Verlinden .............. G03C 1/765
65/148

(Continued)

FOREIGN PATENT DOCUMENTS

CN 101328026 A 12/2008
JP 2000053451 A * 2/2000 ........... C03C 21/005
(Continued)

OTHER PUBLICATIONS

Yates et al., "Statistical analysis of the metrological properties of float glass," Proc. SPIE 7077, Advances in X-Ray/EUV Optics and Components III, 70770D (Sep. 3, 2008) (Year: 2008).*

(Continued)

*Primary Examiner* — David R Sample
(74) *Attorney, Agent, or Firm* — Ohlandt, Greeley, Ruggiero & Perle, L.L.P.

(57) ABSTRACT

A chemically toughened ultrathin glass is provided. The glass has a thickness less than 500 μm and a surface compressive layer having a depth of at most 30 μm. The toughened ultrathin glass sheet is more flexible and has extraordinary thermal shock resistance with the glass being easier to handle for processing.

25 Claims, 2 Drawing Sheets

(51) Int. Cl.
*C03C 3/091* (2006.01)
*C03C 3/093* (2006.01)
*B32B 17/06* (2006.01)
*C03C 17/22* (2006.01)
*C03C 17/28* (2006.01)
*C03C 17/32* (2006.01)
*C03B 17/06* (2006.01)
*C03B 33/09* (2006.01)
*B23K 26/0622* (2014.01)
*C03B 18/02* (2006.01)

(52) U.S. Cl.
CPC ... *B32B 2307/7242* (2013.01); *B32B 2457/00* (2013.01); *B32B 2457/12* (2013.01); *B32B 2457/14* (2013.01); *B32B 2457/20* (2013.01); *C03B 18/02* (2013.01); *Y02P 40/57* (2015.11)

(56) References Cited

U.S. PATENT DOCUMENTS

| | | | |
|---|---|---|---|
| 6,815,070 B1* | 11/2004 | Burkle | B32B 3/04 427/165 |
| 8,232,218 B2 | 7/2012 | Dejneka et al. | |
| 2009/0197048 A1 | 8/2009 | Amin et al. | |
| 2009/0220761 A1 | 9/2009 | Dejneka et al. | |
| 2009/0298669 A1 | 12/2009 | Akiba et al. | |
| 2010/0009154 A1 | 1/2010 | Allan et al. | |
| 2010/0047522 A1* | 2/2010 | Sivarajan | H01B 1/18 428/143 |
| 2011/0003619 A1* | 1/2011 | Fujii | C03C 3/083 455/566 |
| 2011/0281093 A1 | 11/2011 | Gulati et al. | |
| 2011/0300908 A1* | 12/2011 | Grespan | C03B 33/091 455/566 |
| 2012/0048604 A1 | 3/2012 | Cornejo et al. | |
| 2012/0237779 A1* | 9/2012 | Teranishi | B65D 85/672 428/426 |
| 2013/0034670 A1* | 2/2013 | Hashimoto | C03C 3/095 428/1.32 |

FOREIGN PATENT DOCUMENTS

| | | |
|---|---|---|
| WO | 2011149694 A1 | 12/2011 |
| WO | 2012126394 A1 | 9/2012 |

OTHER PUBLICATIONS

3M Optically Clear Adhesives (Jul. 2008). (Year: 2008).*
Definition of acrylic in English, https://en.oxforddictionaries.com/definition/acrylic. Visited Jan. 18, 2018. (Year: 2018).*
International Search Report dated Dec. 19, 2013 for corresponding International Application No. PCT/CN2013/072695.
Written Opinion dated Dec. 19, 2013 for corresponding International Application No. PCT/CN2013/072695.
International Preliminary Report on Patentability dated Mar. 23, 2015 for corresponding International Application No. PCT/CN2013/072695.

* cited by examiner

CHEMICALLY TOUGHENED FLEXIBLE ULTRATHIN GLASS

CROSS REFERENCE TO RELATED APPLICATIONS

This application is a continuation of International Application No. PCT/CN2013/072695 filed Mar. 15, 2013, the entire contents of which are incorporated herein by reference.

BACKGROUND

1. Field of the Invention

The invention is related to a chemically toughened ultrathin glass, in particular, related to a high strength flexible glass, and more particularly, related to a flexible glass used for flexible electronics for flexible printing, sensors for touch panels, substrates for thin film cells, mobile electronic devices, semiconductor interposers, bendable displays, solar cells or other applications in need of high chemical stability, temperature stability, low gas permeability as well as flexibility and low thickness. Besides consumer and industrial electronics the current invention could also be used for protection applications in industrial manufacture or metrology.

2. Description of Related Art

Thin glass with different compositions is suitable substrate materials for many applications where chemical and physical properties such as transparency, chemical and thermal resistance are of great importance. For example, alkaline free glass such as AF32®, AF37®, AF45® available from SCHOTT can be used for display panels, and wafers as electronic packaging materials. Borosilicate glass also can be used for fire protection, thin and thick film sensors, and lab wares such as micro-mechanical components and lithographic masks.

Ultrathin glass is typically applied in electronics applications, such as films and sensors. At the present time, the increasing demands for new functionalities of products and exploiting new and broad applications call for thinner and lighter glass substrates with new properties such as flexibility.

Typically, thin glass is made by grinding a thicker glass such as borosilicate glass, however, glass sheets with a thicknesses lower than 0.5 mm would be difficult to be made via grinding and polishing larger glass sheets, or can be produced only under extremely strict conditions. Glass thinner than 0.3 mm, or even with a thickness of 0.1 mm, such as D263®, MEMpax®, available from SCHOTT, can be produced by down-drawing. Also, soda lime glass with a thickness of 0.1 mm can be produced by special float process.

The main challenge for applying ultrathin glass substrates to electronics lies in the treatability of thin glass sheets. Normally, there is lack of ductility for glass, and the possibility of breakage largely depends on the mechanical strength of the sheet itself. For thin glass, some methods have been proposed. U.S. Pat. No. 6,815,070 (Mauch et al.) proposed coating thin glass with organic or polymer films to improve the breaking strength of glass. Nevertheless, there yet exist some disadvantages for this method, for example, the improvement in strength is not sufficient and then some other sophisticated processes must be adopted when glass sheets cut. In addition, the polymer coating would exert a negative influence on the thermal durability and optical property of glass sheets.

In addition, chemical toughening is a well-known process to increase strength of a thicker glass like soda lime glass or aluminosilicate (AS) glass that is used as cover glass for display applications, for example. In this circumstance, the surface compressive stresses (CS) are typically between 600 and 1,000 MPa and the depth of the ion-exchange layer is typically bigger than 30 μm, preferably bigger than 40 μm. For safety protection applications in transportation or aviation, AS Glass has a exchange layer bigger than 100 μm. Normally, a glass having both high CS and high DoL is expected for all the applications when the glass thickness ranges from about 0.5 mm to 10 mm. However, for ultrathin glass, the high CS at a high DoL will result in self breakage due to high central tensile stress of glass, therefore, new parameters should be controlled for ultrathin glass which are different from those used for cover glass.

Studies have been conducted on chemical toughening of glass in a great number of inventions, for example, US 2010/0009154 describes a glass of 0.5 mm or thicker with an outer region of compressive stress, the outer region has a depth of at least 50 μm and the compressive stress is at least higher than 200 MPa, the step of forming the central tensile stress (CT) and the compressive stress in the surface region comprises successively immersing at least a portion of the glass in a plurality of ion exchange baths, and the glass thus obtained could be used for consumer electronic. The parameters and requirements for production of such glass do not apply to production of ultrathin glass because the central tension would be so high as to cause self-breakage of glass.

US 2011/0281093 describes a strengthened glass with damage resistant ability, the strengthened glass article has a first and second compressive stress surface portions opposite each other bound to a tensile stress core portion, with the first surface portion having a higher level of compressive surface stress than the second surface portion for the purpose of improving the resistance to surface damage. The compressive stress surface portions are provided by lamination, ion-exchange, thermal tempering, or combinations thereof to control the stress profile and to limit the breakage energies of articles.

WO 11/149694 discloses an antireflection coating glass which is chemically strengthened, with a selected coating on at least one of the surfaces of the glass article, where the coating is selected from the group consisting of an antireflection and/or an antiglare coating, and said coating contains at least 5 wt % of potassium oxide.

US 2009/197048 sets forth that a chemically toughened glass is bonded with a functional coating in order to serve as a cover plate. The glass article has a surface compressive stress of at least about 200 MPa, a surface compressive layer depth in the range of 20 μm to 80 μm, and has an amphiphobic fluorine-based surface layer chemically bonded to the surface of the glass article to form a coated glass article.

In U.S. Pat. No. 8,232,218, heat treatment has been used for improving the effects of chemical toughening of glass. The glass article has an anneal point and a strain point, wherein the glass article is quenched from a first temperature that is higher than the anneal point of the glass article to a second temperature that is lower than the strain point. The fast cooled glass will have a higher compressive stress and a thicker ion-exchange layer after chemical toughening.

In US 2012/0048604, the ion-exchanged ultrathin aluminosilicate or aluminoborosilicate glass sheet is used as interposer panels for electronics. The interposer panels include a glass substrate core formed from ion-exchange of glass. The coefficient of thermal expansion (CTE) is set to match that of semiconductors and metallic materials and the like. However, in this patent application, a compressive stress higher than 200 MPa on the surface layer is required, and the depth of the layer is apt to become too deep for aluminosilicate or aluminoborosilicate glass. The above factors make ultrathin glass difficult for practical use. Besides, the flexibility of glass and how to improve it are not considered. In fact, the flexibility is the most important factor for its application for the ultrathin glass with a thickness equal or less than 0.3 mm. In addition, chemical strengthening process requires immersion of a glass substrate into a salt bath at high temperature, and the process would require the glass itself to possess high thermal shocking resistance. Throughout the disclosure of the invention, it is not discussed how to adjust the glass composition and the relevant functions to meet the said requirements.

For example, self-breakage is a serious problem for aluminosilicate glass, because the high CTE of aluminosilicate glass lowers the thermal shock resistance, increasing the possibility of breakage for thin glass during toughening and other treatments. On the other hand, most aluminosilicate glasses have a higher CTE that does not match that of semiconductor electronic devices, increasing the difficulty for treatment and application.

The current invention has successfully solved the above technical problems present in the prior art via providing a novel flexible glass substrate whose flexibility can be enhanced by chemical toughening. Meanwhile, the composition of ultrathin flexible glass has been specially designed to acquire excellent thermal shocking resistance for chemical toughening and practical use. Another important fact is that the flexible ultrathin glass of the present invention is characterized by having lower compressive stress and shallower depth of compressive stress layer compared to other glasses after being chemically toughened. Such properties make the glass sheet of the present invention more suitable for practical processing.

SUMMARY

The invention provides a chemically toughened ultrathin glass which has high flexibility, thermal shock resistance, scratch resistance and transparency. Said ultrathin glass has a thickness less than or equal to 500 µm, the ion exchange layer has a thickness less than or equal to 30 µm, and the central tensile stress is less than or equal to 120 MPa. The ultrathin glass has lower coefficient of thermal expansion (CTE) and lower Young's modulus to improve thermal shock resistance and flexibility. In addition, the lower CTE of the glass according to the invention is able to well match those of semiconductor devices and inorganic materials, achieving excellent properties and better application.

In one embodiment, the glass is an alkaline containing glass, such as alkali silicate glass, alkali borosilicate glass, alkali aluminoborosilicate glass, alkali boron glass, alkali germinate glass, alkali borogermanate glass, and combinations thereof.

Accordingly, one aspect of the invention is to provide a novel glass. The glass contains alkali to allow for ion exchange and chemical toughening. The depth of the ion exchange layer (DoL) is controlled to be less than 30 µm and the CS is controlled to be below 700 MPa.

A second aspect of the invention is to provide a novel ultrathin flexible glass which has a CTE lower than $9.5 \times 10^{-6}/K$ and a Young's modulus lower than 84 GPa to realize excellent thermal shocking resistance and flexibility.

A third aspect of the invention is to provide a method for making said glass. The glass can be produced via down drawing, overflow fusion, special float or redrawing, or by grinding or etching from a thicker glass. In the current invention, the mother glass can be provided in the form of sheets or rolls. The mother glass has a pristine surface with a roughness Ra less than 5 nm, and one or two of the surfaces of the glass are subjected to ion exchanged and thus chemically toughened. The chemically toughened ultrathin glass is an ideal selection for roll-to-roll processing.

A forth aspect of the invention is to provide a glass article with additional functions. In one embodiment, the ultrathin glass coated with non-indium tin oxide (ITO) conductive coating can be used as the flexible or bendable conducting film having a lower water vapor transmission rate (WVTR). The ultrathin non-ITO conductive coating glass can be used as flexible sensors or flexible circuit boards for electronic devices, solar cells and displays. In another embodiment, one or two surfaces of the ultra thin glass can be structured, acquiring antiglare (AG) function that can provide the sheet with better touch experience and visual comfort. In yet another embodiment, the one or two surfaces of the ultrathin glass sheet contain $Ag+$ or $Cu2+$ ions of at least 1 ppm to realize antibacteria or antimicrobial function. Further, the said article can be laminated with polymer materials to serve as flexible substrates with excellent water vapor barrier capability.

Especially, such toughened ultrathin glass sheet with flexibility and scratch resistance also can be used as protective films for cell phones, tablets, laptops, resistance screens, TVs, mirrors, windows, aviation widows, furniture, and white home appliances.

These and other aspects, advantages, and features according to the current invention will be described in more detail in the following paragraphs with reference to drawings.

TERMINOLOGIES

Figure 1:
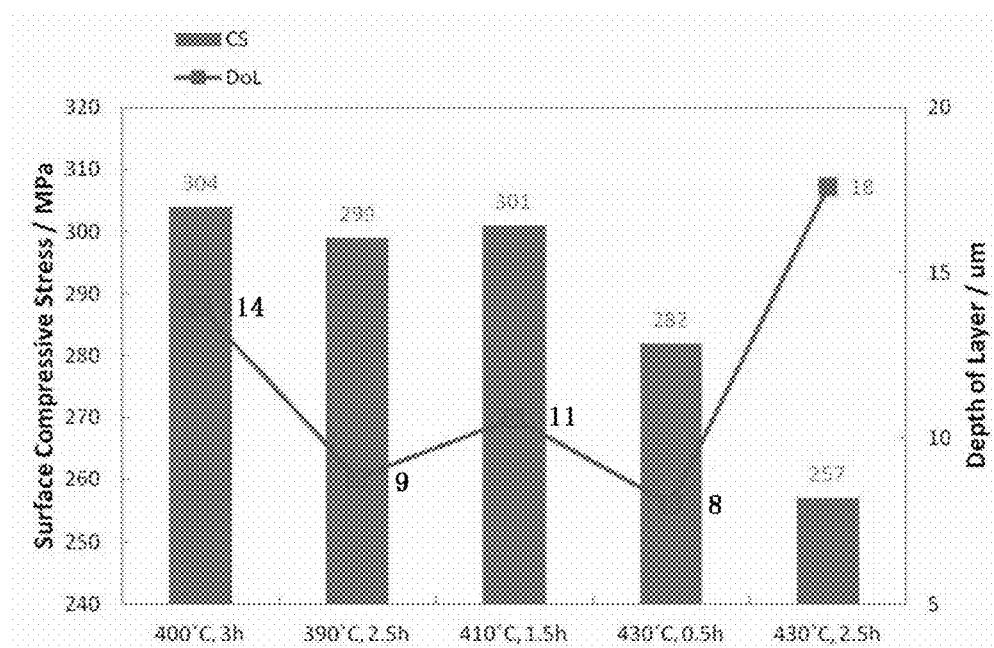
FIG. 1 shows the CS and DoL profiles of the ultrathin glass after being chemically toughened.

Compressive stress (CS): the stress that results from extrusion effect on glass network by glass surface after ion exchange while no deformation occurs in the glass, as measured by commercially available stress measuring instrument FSM6000 based on the optical principle.

Depth of ion exchanged layer (DoL): the thickness of the glass surface layer where ion exchange occurs and compressive stress produces. DoL can be measured by commercially available stress measuring instrument FSM6000 based on the optical principle.

Central tensile stress (CT): the tensile stress that is generated in the interlayer of glass and counteracts the compressive stress that is generated between the upper and lower surfaces of the glass after ion exchange. The CT can be calculated from the measured CS and DoL.

Average roughness (Ra): the roughness means that processed surfaces have smaller interval and tiny peak and valley unevenness, and the average roughness Ra is the arithmetic mean value of material surface profile deviation absolute values within the sampling length. Ra can be measured by an atomic force microscope.

Coefficient of thermal conductivity (λ): the capability to conduct heat of substances. λ can be measured by a commercially available thermal conductivity measuring instrument.

Strength of materials (σ): the maximum stress that materials are able to bear in the case of no breakage. σ can be measured by three point bending or four point bending tests. In this patent it is defined as the average value measured by a set of experiments.

Poisson ratio of materials (μ): the ratio of transverse strain to longitudinal strain of materials under forces. μ can be measured by tests in which a load is applied to materials and strains are recorded.

Gloss: the ratio of the front reflection light amount from the surface of materials to the front reflection light amount from the surface of the standard board under identical conditions. Gloss can be measured by a commercially available gloss measuring instrument.

Haze: the percentage of decrease in transparency of transparent materials due to light scattering. Haze can be measured by a commercially available haze measuring instrument.

DETAILED DESCRIPTION

If the thickness of glass sheets is thinner than 0.5 mm, handling of the glass becomes difficult mainly due to defects such as cracks and chippings at the edges of glass, which lead to breakage, and then the overall mechanical strength, for instance, the bending or impact strength performances, would be significantly reduced. Usually, for a thicker glass, the edge can be grinded with numerical control machine tool (CNC) to remove the defects, but for an ultrathin glass having a thickness less than 0.5 mm, the mechanical grinding becomes very difficult, and cannot apply thereto especially when the thickness is less than 0.3 mm. Etching on the edge could be one solution for ultrathin glass to remove the defects, but the flexibility of ultrathin glass sheet is still limited by the low bending strength of glass itself, therefore, strengthening of the glass is extremely important for ultrathin glass. Strengthening, also called as toughening, can be done by coating of surfaces and edges. However, it is of high cost and low efficiency. Surprisingly it has been found that a specific glass having a composition containing alkali and aluminum with a specific thicknesses that is subjected to specific chemical toughening procedures not only can achieve high mechanical strength, but also can achieve good flexibility and bendability.

After ion exchange, the compressive stress layer is formed on the surface of glass. The compressive stress can counteract the tensile stress when glass sheet is bent, therefore, the strength of glass is improved, making the glass easier to handle and process. However, the CS and DoL values recommended for thicker soda-lime or aluminosilicate glass which are commonly used for chemical toughening do not apply to the ultrathin glass sheet of the invention any longer. For an ultrathin glass lower than 0.5 mm, the DoL and CT values are much more critical than that for a thicker glass, and the glass would be damaged if they are too high. Therefore, a DoL lower than 30 μm and a CT lower than 120 MPa are the basic requirements for chemically toughened ultrathin glass.

Surprisingly, alkali and boron contained silicate glass with a specially designed composition can meet the toughening requirements of ultrathin glass of low CS, low DoL and relatively longer toughening time. The composition of glass must be different from common glasses to realize controllable and suitable chemical toughening results. Also, for the current invention, the thermal shock resistance of raw glass sheet before chemical toughening and the stiffness of glass are key factors. In order to meet these requirements the glass composition should be carefully designed.

In one embodiment, the ultrathin glass is a lithium aluminosilicate glass with the following composition (in wt %):

| Composition | (wt %) |
|---|---|
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| $ZnO$ | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 | optionally, coloring oxides can be added, such as $Nd_2O_3$, $Fe_2O_3$, $CoO$, $NiO$, $V_2O_5$, $MnO_2$, $TiO_2$, $CuO$, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet, and the total amount of all composition being 100 wt %.

The lithium aluminosilicate glass of the invention preferably has the following composition:

| Composition | (wt %) |
|---|---|
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| $ZnO$ | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 | optionally, coloring oxides can be added, such as $Nd_2O_3$, $Fe_2O_3$, $CoO$, $NiO$, $V_2O_5$, $MnO_2$, $TiO_2$, $CuO$, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet, and the total amount of all composition being 100 wt %.

The lithium aluminosilicate glass of the invention most preferably has the following composition:

| Composition | (wt %) |
|---|---|
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |

-continued

| Composition | (wt %) |
| --- | --- |
| F | 0-1 |
| $B_2O_3$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet, and the total amount of all composition being 100 wt %.

In one embodiment, the ultrathin flexible glass is a soda lime glass with the following composition and comprises (in wt %):

| Composition | (wt %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet, and the total amount of all composition being 100 wt %.

The soda lime glass of the present invention preferably has the following composition:

| Composition | (wt %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The soda lime glass of the present invention most preferably has the following composition:

| Composition | (wt %) |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

In one embodiment, the ultrathin flexible glass is a borosilicate glass with the following composition (in wt %):

| Composition | (wt %) |
| --- | --- |
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The borosilicate glass of the present invention more preferably has the following composition:

| Composition | (wt %) |
| --- | --- |
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The borosilicate glass of the present invention most preferably has the following composition:

| Composition | (wt %) |
| --- | --- |
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

In one embodiment, the ultrathin flexible glass is an alkali metal aluminosilicate glass with the following composition (in wt %):

| Composition | (wt %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The alkali metal aluminosilicate glass of the present invention more preferably has the following composition:

| Composition | (wt %) |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The alkali metal aluminosilicate glass of the present invention most preferably has the following composition:

| Composition | (wt %) |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

In one embodiment, the ultrathin flexible glass is a low-alkali aluminosilicate glass with the following composition (in wt. %):

| Composition | (wt. %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The low-alkali aluminosilicate glass of the current invention more preferably has the following composition (in wt. %):

| Composition | (wt. %) |
|---|---|
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

The low-alkali aluminosilicate glass of the current invention most preferably has the following composition (in wt. %):

| Composition | (wt. %) |
|---|---|
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 | optionally, coloring oxides can be added, such as $Nd_2O_3$, $Fe_2O_3$, CoO, NiO, $V_2O_5$, $MnO_2$, $TiO_2$, CuO, $CeO_2$, $Cr_2O_3$, 0-2 wt % of $As_2O_3$, $SB_2O_3$, $SnO_2$, $SO_3$, Cl, F and/or $CeO_2$ can be added as refining agents, and 0-5 wt % of rare earth oxides can also be added to introduce magnetic or photon or optical functions into the glass sheet and the total amount of all composition being 100 wt %.

Table 1 shows several typical embodiments of ultrathin alkaline containing glasses to be chemically toughened.

TABLE 1

EMBODIMENTS OF ALKALINE CONTAINING BOROSILICATE GLASSES

| Composition (wt %) | Example 1 | Example 2 | Example 3 | Example 4 | Example 5 | Example 6 | Example 7 | Example 8 |
|---|---|---|---|---|---|---|---|---|
| $SiO_2$ | 80 | 64 | 70 | 61 | 68 | 70 | 67 | 60 |
| $Al_2O_3$ | 3 | 7 | 1 | 18 | 9 | 8 | 6 | 7 |
| LiO | 0 | 0 | 0 | 5 | 0 | 0 | 0 | 0 |
| $Na_2O$ | 5 | 6 | 8 | 10 | 5 | 3 | 5 | 8 |
| $K_2O$ | 0 | 6 | 8 | 1 | 2 | 6 | 4 | 5 |
| CaO | 0 | 0 | 7 | 1 | 2 | 0 | 0 | 0 |
| BaO | 0 | 0 | 2.5 | 0 | 2 | 0 | 0 | 0 |
| ZnO | 0 | 5 | 2.4 | 0 | 0 | 1 | 2 | 0 |
| $ZrO_2$ | 0 | 0 | 0 | 3 | 3 | 0 | 0 | 0 |
| $B_2O_3$ | 12 | 8 | 0.1 | 1 | 8 | 12 | 16 | 20 |
| $TiO_2$ | 0 | 4 | 1 | 0 | 0 | 0 | 0 | 0 |

$SiO_2$, $B_2O_3$ and $P_2O_5$ work as the glass network former. Their contents should not be less than 40% for conventional processes, or the glass sheet cannot be formed and would tend to become brittle and loss transparency. The higher $SiO_2$ content will require higher melting and working temperature during glass production, and thus it normally should be less than 90%. Addition of $B_2O_3$ and $P_2O_5$ to $SiO_2$ can modify the network property and decrease the melting and working temperature of glass. Also, the glass network former has a strong influence on the CTE of glass.

In addition, the $B_2O_3$ in the glass network can form two different polyhedron structures which are more adaptable to loading force from outside. Addition of $B_2O_3$ usually results in lower thermal expansion and lower Young's modulus which in turn leads to good thermal shock resistance and slower chemical toughening whereby low CS and low DoL could be easily obtained. Therefore, the addition of $B_2O_3$ to ultrathin glass can greatly improve the chemical toughening and the thus chemically toughened ultrathin glass has found more of practical applications.

$Al_2O_3$ works as the glass network former and the glass network modifier as well. The [AlO4] tetrahedral and [AlO6] hexahedral are formed in the glass network depending on the amount of $Al_2O_3$, and they can adjust the ion exchange speed by changing a size of space for ion exchange inside the glass network. If the amount of $Al_2O_3$ is too high, for example, higher than 40%, the melting temperature and working temperature of glass will also be very high and tend to crystallize, causing the glass to loss the transparency and flexibility.

Alkali metal oxides, such as $K_2O$, $Na_2O$ and $Li_2O$ works as the glass processing modifier, and they can destroy the glass network with forming of non-bridge oxides inside the glass network. Adding alkali metals can reduce the processing temperature of glass and increase the CTE of glass. The presence of sodium and lithium is necessary for the ultrathin flexible glass to be chemically toughened, for the ion exchange of Na+/Li+, Na+/K+ and Li+/K+ is a necessary step for toughening. The glass will not be toughened if it does not contain alkali metals itself. However, the total amount of alkali metals should not be higher than 30%, or the glass network will be completely destroyed without forming of the glass. Another important factor is that the ultrathin glass should have a low CTE, and then the glass should not contain an excessive amount of alkali metals so as to meet such requirement.

Alkaline earth element oxides such as MgO, CaO, SrO and BaO work as the network modifier and are able to decrease the forming temperature of glass. These elements can change the CTE and Young's modulus of glass, and the alkaline earth elements have a very important function to change the refractive index of glass to meet special requirements. For example, MgO can decrease the refractive index of glass while BaO can increase the refractive index. The amount of alkaline-earth elements should not be higher than 40% for the glass production.

Some transition metal element oxides in glass such as ZnO and $ZrO_2$ have the similar function to that of alkaline earth elements. Other transition metal elements such as $Nd_2O_3$, $Fe_2O_3$, CoO, NiO, $V_2O_5$, $MnO_2$, $TiO_2$, CuO, $CeO_2$ and $Cr_2O_3$ works as the coloring agent to make the glass possess the special photons or exhibit the optical functions, for example, color filtering or light conversion.

Typically, an ultrathin glass that contains alkali metal ions can be produced by grinding or etching from thicker glasses. The two methods are easy to conduct, but are not economical. Meanwhile, the surface quality, e.g. Ra roughness and waviness, is not good. Redrawing can also be used to form the ultrathin glass from a thicker glass, but it's costs are also high and not easy to realize a high efficient mass production.

The other production processes of ultrathin alkali-containing borosilicate glass sheet include down draw, overflow fusion, and special float. The down draw and the overflow fusion are preferred for mass production, which are economical, thereby producing an ultrathin glass with a thickness from 10 μm to 500 μm having high surface quality. The down-draw or the overflow fusion process can make a pristine or fire-polished surface with a roughness Ra less than 5 nm, preferred less than 2 nm, and more preferred less than 1 nm. For practical use in electronics, the glass sheet has a thickness variation tolerance less than ±10%. The thickness also can be precisely controlled at ranging from 10 μm to 500 μm. It is the thin thickness that imparts flexibility to the glass. The special float can produce an ultrathin glass with the pristine surface, which is economical and suitable for mass production, too, but the glass produced by float has one side as the tin-side which is different from the other side. The difference between the two sides would cause the warp of glass after chemical toughening, and further affect the printing or coating process because the two sides have different surface energies.

The ultrathin glass can be produced and processed in the form of sheets or rolls. The sheet size is larger than or equal to 100×100 mm2, and preferred larger than 400×320 mm2, and more preferred larger than 470×370 mm2 and most preferred larger than 550×440 mm2. The ultrathin glass roll has a width larger than 250 mm, and preferred larger than 320 mm, and more preferred larger than 370 mm, and most preferred larger than 440 mm. The length of a glass roll is longer than 1 m, and preferred longer than 10 m, more preferred longer than 100 m, and most preferred longer than 500 m.

The toughening process can be done by immersing glass sheets and glass rolls into a salt bath containing monovalent ions to exchange with alkali ions inside the glass. The monovalent ions in the salt bath has a diameter larger than that of alkali metal ions inside the glass, then it can produce compressive stress acting on the glass network after ion exchange. After ion exchange, the strength and flexibility of ultrathin glass are enhanced. In addition, the CS induced by chemical toughening can increase the scratch resistance of glass so that the toughened glass would not be scratched easily, and the DoL can increase the scratch tolerance that the glass is less likely broken, even scratched.

The salt most typically used for chemical toughening is Na+ contained melted salt or K+ contained melted salt or mixtures thereof. The commonly used salts include $NaNO_3$, $KNO_3$, NaCl, KCl, $K_2SO_4$, $Na_2SO_4$ and $Na_2CO_3$, additives like NaOH, KOH and other sodium salts or potassium salts or caesium salts are also used for better controlling of the rate of ion exchange for chemical toughening. Ag+ containing or Cu2+ containing salt baths can be used to introduce anti-microbial function to the ultrathin glass.

Said ion exchange is carried out in an online roll-to-roll process, or in an online roll-to-sheet process. In these processes, glass rolls are charged into a chemically strengthening bath and rolled again or cut to sheets afterwards. Alternatively, the chemically strengthened glass rolls can be directly charged into a line of bath cleaning, and rolled again or cut to sheets afterwards.

As the glass is very thin, ion exchange should not be conducted too fast or too deep, and the central tensile stress CT value of glass is critical for ultrathin glass and can be expressed as the following equation:

$$\sigma_{CT} = \frac{\sigma_{CS} \times L_{DoL}}{t - 2 \times L_{DoL}}$$

Where σCS is the value of CS, LDoL is the thickness of DoL, t is the thickness of glass. The unit for stress is MPa, and for thickness is μm. Ion exchange should not be performed as deep as that of a thicker glass; and it should not be carried out too fast in order to provide a precise control of the chemical toughening process. Deep DoL would induce high CT and cause self breakage of ultrathin glass, or even make CS vanish if ultrathin glass is completely ion exchanged, without strengthening. Typically, the high DoL via chemical toughening does not increase the strength and flexibility of ultrathin glass.

According to the present invention, for ultrathin glass, the thickness of glass t has a special relationship with DoL, CS and CT as follows:

$$\frac{0.2t}{L_{DoL}} \leq \frac{\sigma_{CS}}{\sigma_{CT}}$$

Table 2 lists one embodiment wherein the CS and DoL have to be controlled within specific ranges to achieve the optimal strength and flexibility. Samples are chemically toughened in pure $KNO_3$ salt bath at a temperature between 350° C. to 480° C. for 15 minutes to 48 hours to obtain controlled CS and DoL values.

TABLE 2

TECHNICAL SPECIFICATIONS FOR TOUGHENING

| Thickness | DoL (μm) | CS (MPa) | CT (MPa) |
|---|---|---|---|
| 0.5 mm | <30 | <700 | <120 |
| 0.3 mm | <30 | <700 | <120 |
| 0.2 mm | <20 | <700 | <120 |
| 0.1 mm | <15 | <600 | <120 |
| 70 μm | <15 | <400 | <120 |
| 50 μm | <10 | <350 | <120 |
| 25 μm | <5 | <300 | <120 |
| 10 μm | <3 | <300 | <120 |

In a specific embodiment, the borosilicate glass possesses the properties of relative low CTE, low specific Young's modulus, and high thermal shock resistance. Besides these advantages, said borosilicate glass contains alkali and can also be chemically toughened. The CS and DoL can be well controlled due to the relatively slow exchange processes.

The processing of ultrathin glass is also important for the strength and flexibility and even the thermal shocking resistance is correlated with the quality of processing. Further processing of ultrathin flexible glass includes mechanical cutting with diamond tips or cutting wheels or alloy cutting wheels, thermal cutting, laser cutting, or water-jet cutting. Structuring methods like ultrasonic drilling, sand blasting, and chemical etching on the edge or surface also can be applied to make structures on the glass sheet.

The said laser cutting includes both conventional and unconventional laser cuttings. The conventional laser cutting is realized by continuous wave (CW) laser, such as $CO_2$ laser and common green laser, common infrared laser, common UV laser, and rapid heating by laser and followed by fast quench leads to glass breaking and separation. Direct heating by laser to vaporize materials is also possible with a high energy laser, but at a very slow cutting rate. Both of the two processes lead to unwanted microcracks and a rough surface finish. Materials cut with conventional laser processes require post processing in order to remove the unwanted edges and surface damages. For ultrathin glass, the edge is difficult to process and thus the conventional laser cutting is normally followed by chemical etching as the post processing.

The unconventional laser cutting is based on filaments of ultrashort pulsed laser, wherein ultrashort laser pulses in the nanosecond or picosecond or femtosecond or attosecond range are employed which cut brittle materials via plasma dissociation induced by filamentation or self-focusing of pulse laser. This unconventional process ensures higher quality cutting edge, lower surface roughness, higher bending strength, and faster processing. This new laser cutting technology works especially well on chemically strengthened glass and other transparent materials which have been difficult to cut with conventional methods.

The thermal stress caused by temperature difference is responsible for the breakage of glass under thermal shocking. Also, the thermal stress induced by thermal process also can decrease glass strength, causing the glass to become more brittle and lose the flexibility. In addition, ultrathin glass is more sensitive to thermal stress than thick glass. As a result, the thermal shock resistance and the thermal stress resistance are especially relevant to each other when application of thin glass sheets.

In one embodiment, chemical toughening includes fast heating and quenching and then thermal shocking is inevitable during this process. A chemical toughening salt bath is usually heated to a temperature higher than 350° C., or even up to 700° C. to allow the salt bath to melt. When immersing an ultrathin glass into a salt bath, temperature gradients establish between the glass and the salt bath, and the gradient also forms inside one single piece of glass once part of a glass is immersed into salt bath. On the other hand, when taking the ultrathin glass out of the salt bath, it is usually a fast quenching process. Due to the low thickness, the ultrathin glass is more prone to break at the same temperature gradient. The thermal shock processes therefore result in low yield when toughening ultrathin glass without specially designing of its composition. Although preheating and post-annealing can reduce the temperature gradient, but they are time and energy consuming processes. Therefore, the high thermal shock resistance is greatly preferred for ultrathin glass to simplify the chemical toughening process and improve the yield. In addition to chemical toughening, the thermal stress can also be introduced during post processing after chemical toughening, such as laser cutting or thermal cutting.

From the explanations above, the thermal shock resistance of mother glass before chemical toughening is the most important factor for the flexible ultrathin glass, because the thermal shocking resistance determines economical availability of said toughened glass with high quality. The composition of the mother glass sheet also plays a key role in glass manufacture and then should be carefully designed for each type of glass which has been already described in the proceeding paragraphs.

The robustness of a material to thermal shock is characterized with the thermal shock parameter:

$$R = \frac{\sigma(1-\mu)\lambda}{E\alpha}$$

where R is the thermal shock resistance; $\lambda$ is the coefficient of thermal conductivity; $\alpha$ is the CTE; $\sigma$ is the strength of a material; E is the Young's modulus and $\mu$ is the Poisson ratio.

A higher value for R represents greater resistance to thermal shock failure. Accordingly, the thermal stress resistance for glass is determined by the maximum thermal loading $\Delta T$ from the following equation:

$$\Delta T \propto \frac{2\sigma(1-\mu)}{E\alpha}$$

Obviously, a glass with a higher R would have a higher thermal stress and hence have greater resistance to thermal shock.

For practical use, R for either a toughened or an untoughened ultrathin glass sheet should be higher than 190 W/m2, preferred higher than 250 W/m2, more preferred higher than 300 W/m2, and $\Delta T$ for either a toughened or an untoughened ultrathin glass sheet should be higher than 380° C., preferably higher than 500° C., more preferably higher than 600° C.

The CTE is a key factor to fulfill the requirement as mentioned above for the thermal shocking resistance of ultrathin glass. The glass with a lower CTE and Young's modulus has higher thermal shock resistance and are less prone to breakage caused by temperature gradient and has an advantage of reducing the uneven distribution of thermal stress in chemical toughening process and other high temperature processes such as coating or cutting. The CTE for a glass sheet either before or after chemical toughening should be lower than $9.5\times10^{-6}$/K, normally lower than $8\times10^{-6}$/K, preferably lower than $7\times10^{-6}$/K, more preferably lower than $6\times10^{-6}$/K, and most preferably lower than $5\times10^{-6}$/K.

The resistance to temperature gradient (RTG) can be measured by the following experiment: glass samples of size 250×250 mm2 are made firstly, and then the samples are heated in the center of the panel to a defined temperature, at the same time the edges are maintained at room temperature. The difference in temperature between the hot center of the panel and the cool panel edge represents the resistance to temperature difference of glass when the breakage occurs in less than or equal to 5% of the samples. For application of ultrathin glass, the RTG for a glass sheet either before or after chemical toughening is higher than 50 K, preferably higher than 100 K, more preferably higher than 150 K, and most preferably higher than 200 K.

The experiment to test the resistance to thermal shock (RTS) is conducted as follows: glass samples of size 200×200 mm2 are made firstly, the samples are heated in an oven with circulating air, afterwards are doused in the center with 50 ml of cold (room temperature) water. The resistance to thermal shock value is the difference in temperature between the hot panel and the cold (room temperature) water, at which breakage occurs in less than or equal to 5% of the samples. For application of ultrathin glass, the RTS for a glass sheet either before or after chemical toughening is higher than 75 K, preferably higher than 115 K, more preferably higher than 150 K, and most preferably higher than 200 K.

R is a theoretical calculation value to evaluate the thermal shock resistance without performing a thermal shock experiment. However, the thermal shocking resistance of glass will also be affected by other factors, e.g. the shape of the sample, the thickness and processing history. The RTS is an experimental result which measures the specific thermal shock resistance of glass for a given condition. The properties of glass material have been taken into consideration in calculation of the R, while the RTS is involved with other factors in practical use. The RTS is proportional to the R when other conditions are the same for glass.

$\Delta T$ is also a theoretical calculation value similar to R to evaluate the temperature difference resistance of glass material without performing a temperature difference experiment. However, the resistance to temperature difference of glass is also highly dependent on the specific conditions such as a size of a glass sample, the thickness of a glass, and the processing history of a glass. The RTG is an experimental result measuring the specific resistance to temperature difference of glass for a given condition. The properties of glass material have been taken into consideration when calculation of the $\Delta T$, while the RTG is involved with other factors in practical use. The RTG is proportional to the $\Delta T$, but not necessarily equal to each other.

In one embodiment, the lower CTE borosilicate glass has a much higher yield (>95%) for chemical toughening process, while all alumimosilicate glasses are broken due to higher CT induced by higher CS and DoL. Table 3 shows the properties of the embodiments shown in Table 1.

TABLE 3

PROPERTIES OF EMBODIMENTS

| | Example 1 | Example 2 | Example 3 | Example 4 | Example 5 | Example 6 | Example 7 | Example 8 |
|---|---|---|---|---|---|---|---|---|
| E | 64 GPa | 73 GPa | 72 GPa | 83 GPa | 70 GPa | 64 GPa | 63 GPa | 65 GPa |
| Tg | 525° C. | 557° C. | 533° C. | 505° C. | — | — | — | — |
| CTE | 3.3 × 10-6/K | 7.2 × 10-6/K | 9.4 × 10-6/K | 8.5 × 10-6/K | 5.2 × 10-6/K | 5.2 × 10-6/K | 5.6 × 10-6/K | 7.1 × 10-6/K |
| Annealing point | 560° C. | 557° C. | 541° C. | 515° C. | — | — | — | — |
| Density | 2.2 g/cm3 | 2.5 g/cm3 | 2.5 g/cm3 | 2.5 g/cm3 | 2.4 g/cm3 | 2.3 g/cm3 | 2.3 g/cm3 | 2.3 g/cm3 |
| Λ | 1.2 W/mK | 0.9 W/mK | 1 W/mK | 1 W/mK | 1.1 W/mK | 1.1 W/mK | 1.1 W/mK | 1.1 W/mK |
| σ* | 86 MPa | 143 MPa | 220 MPa | 207 MPa | 162 MPa | 117 MPa | 177 MPa | 166 MPa |
| Cutting Method | Diamond cutting wheel | Diamond tip | Filament cutting | Chemical etching | Diamond tip | Diamond cutting wheel | Diamond tip | Diamond tip |
| μ | 0.2 | 0.2 | 0.2 | 0.2 | 0.2 | 0.2 | 0.2 | 0.2 |
| R | 391 W/m | 196 W/m | 260 W/m | 235 W/m | 392 W/m | 309 W/m | 441 W/m | 316 W/m |
| ΔT | 652° C. | 435° C. | 520° C. | 469° C. | 712° C. | 563° C. | 802° C. | 576° C. |
| ε** | 29.1 | 29.2 | 28.8 | 33.2 | 29.2 | 29.1 | 28.6 | 26 |

*It is the strength of glass before chemical toughening; it is also affected by the cutting method
**The unit of ε is GPa · cm3/g The material strength also affects the resistance to thermal shock, because the breakage due to thermal stress only happens when the induced thermal stress exceeds the material strength. After suitable chemical toughening with a controlled CT below 120 MPa, the strength of glass can be enhanced and the resistance to thermal shock also can be improved. Table 4 shows the data of chemically toughened glass examples corresponding to Table 3.

where E is the Young's modulus and ρ is the density of glass. Since the change in the density of glass is not considerable with its composition, the Young's modulus should be lower than 84 GPa, preferably lower than 73 GPa, and more preferably lower than 68 GPa in order to make unltrathin glass flexible enough for rolling. The rigidity of glass ε is less than 33.5 GPa·cm3/g, preferably less than 29.2 GPa·cm3/g, and more preferably less than 27.2 GPa·cm3/g.

TABLE 4

PROPERTIES OF EMBODIMENTS AFTER CHEMICAL TOUGHENING

| | Example 1 | Example 2 | Example 3 | Example 4 | Example 5 | Example 6 | Example 7 | Example 8 |
|---|---|---|---|---|---|---|---|---|
| Chemical toughing condition | 430° C. 15 h | 400° C. 3 h | 430° C. 2 h | 410° C. 1 h | 390° C. 4 h | 430° C. 4 h | 400° C. 3 h | 400° C. 3 h |
| CS | 122 MPa | 304 MPa | 504 MPa | 503 MPa | 473 MPa | 209 MPa | 355 MPa | 477 MPa |
| DoL | 14 μm | 14 μm | 8 μm | 7 μm | 15 μm | 20 μm | 11 μm | 9 μm |
| Salt bath | 100% KNO$_3$ | 100% KNO$_3$ | KNO$_3$ with 1000 ppm AgNO$_3$ | 95% KNO$_3$ + 5% NaNO$_3$ | 100% KNO$_3$ | 99% KNO$_3$ + 1% NaNO$_3$ | 99% KNO$_3$ + 1% NaNO$_3$ | 100% KNO$_3$ |
| Sample size | 100 × 100 × 0.2 mm3 | 50 × 50 × 0.1 mm3 | 50 × 50 × 0.15 mm3 | 200 × 200 × 0.1 mm3 | 50 × 50 × 0.1 mm3 | 150 × 150 × 0.2 mm3 | 200 × 200 × 0.2 mm3 | 250 × 250 × 0.3 mm3 |
| Cutting method before chemical toughing | Diamond cutting wheel | Diamond tip | Filament cutting | Chemical etching | Diamond tip | Diamond cutting wheel | Diamond tip | Diamond tip |
| Yielding rate of chemical toughing | ≥95% | ≥90% | ≥85% | ≥90% | ≥90% | ≥90% | ≥90% | ≥95% |
| σ* | 147 MPa | 329 MPa | 473 MPa | 558 MPa | 470 MPa | 201 MPa | 339 MPa | 466 MPa |
| R | 668 W/m | 451 W/m | 559 W/m | 557 W/m | 1136 W/m | 531 W/m | 846 W/m | 889 W/m |
| ΔT | 1113° C. | 1002° C. | 1118° C. | 1116° C. | 2066° C. | 966° C. | 1537° C. | 1616° C. |

*It is the strength of glass after chemical toughening; it is also affected by the cutting method Ultrathin glass also has lower specific Young's modulus to provide better flexibility. Therefore, the ultrathin glass has less rigidity and better bending behavior, which is especially good for roll-to-roll processing and handling. The rigidity of glass is defined by specific Young's modulus:

$$\varepsilon = \frac{E}{\rho}$$

The flexibility of glass f is characterized with the bending radius (r) when the glass is bendable and no breakage occurs, and is typically defined by the following equation:

$$f = 1/r$$

The bending radius (r) is measured as the inside curvature at the bending position of a material. The bending radius is defined as the minimum radius of the arc at the bending position where a glass reaches the maximum deflection before kinking or damaging or breaking. A smaller r means greater flexibility and deflection of glass. The bending radius is a parameter determined by the glass thickness, the Young's modulus and the glass strength. Chemically toughened ultrathin glass has very shallow thickness, low Young's modulus and high strength. All the three factors contribute to low bending radius and better flexibility. The toughened flexible glass of the invention has a bending radius less than 150 mm, preferably less than 100 mm, and more preferably less than 50 mm.

Applying conductive coatings to toughened ultrathin glass sheets can achieve flexible electric circuits or sensors. Both inorganic and organic coatings can be applied to ultrathin glasses. However, inorganic conductive coatings e.g. ITO commonly used in modern electronics have the disadvantage of not being bendable. After several times of bending, the electrical resistance is increased because cracks are generated during the deformation of substrates and the coatings thereon. Therefore, a thin glass with a thickness lower than 0.3 mm should be coated with non ITO bendable conductive coatings, such as silver nano-wires, carbon nanotubes, graphenes, poly(3,4-ethylenedioxythiophene)/poly(styrenesulfonate) (PEDOT/PSS), polyacetylene, polyphenylene vinylene, polypyrrole, polythiophene, polyaniline, and polyphenylene sulfide. The thickness of the conductive coating is between 0.001 μm and 100 μm, preferably between 0.01 m and 10 μm, and more preferably between 0.08 m and 1 μm. The conductive polymer coating is transparent or translucent or colored. The methods used for applying conductive coatings include chemical vapor deposition method CVD, dip-coating, spin-coating, ink-jet, casting, screen printing, painting and spaying.

One or both sides of ultrathin glass can be coated with bendable coatings. The bendable non-ITO conductive coating has a Young's modulus less than or equal to 50 GPa to make sure that the glass-organic composite cannot be too rigid. The composited ultrathin glass has an adjustable transmittance from 0% to 90% and a sheet electric resistance of 300 Ω/sq, preferred less than 200 Ω/sq, and more preferred less than 150 Ω/sq and is suitable for use in flexible electronics such as copper-indium-gallium-selenium CIGS solar cells and OLED displays.

Another advantage of using non-ITO conductive coating is that the coating process is conducted in low temperature environment. Usually physical vapor deposition PVD method is used for coating ITO, the glass substrate is heated to a temperature as high as 200° C. or even higher. The high temperature will decrease the CS of ultrathin glass sheet and damage the strength and reliability of ultrathin sheet. The non-ITO coating is coated at a temperature usually below 150° C. and the strength and flexibility of ultra-thin glass sheet is kept.

The coated strengthened ultrathin substrate can be further processed by mechanical processing, etching, lithography, laser ablation, ion beam processing or printing, etc. to make circuits for practical use.

Antiglare (AG) function can be added to the flexible glass sheet for use under adverse viewing conditions. One or two surfaces of ultrathin glass can be processed before or after chemical toughening to realize the AG function. Processing methods include sand blasting or chemical etching. After chemical etching the surface of ultrathin glass has a roughness between 50 nm and 300 nm, preferred between 50 nm and 400 nm, more preferred between 80 nm and 300 nm, and most preferred between 100 nm and 200 nm, to realize optimized AG effect, the gloss at a reflection degree of 60° is between 30 and 120, preferably between 40 and 110, more preferably between 50 and 100; the gloss at a reflection degree of 20° is between 30 and 100, preferably 40 and 90, more preferably between 50 and 80; the gloss at a reflection degree of 85° is between 20 and 140, preferably between 30 and 130, more preferably between 40 and 120; and the haze of AG surface is between 3 and 18, preferably between 5 and 15, and more preferably between 7 and 13. The glass sheet with AG function can be applied to surfaces of any objects to provide special touching experience and visual comfort, especially under intense lighting environment.

Antimicrobial function can be add to the flexible glass sheet by ion exchange in Ag+ containing salt bath or Cu2+ containing salt bath. After ion exchange the concentration of Ag+ or Cu2+ on the surface is higher than 1 ppm, preferably higher than 100 ppm, and more preferably higher than 1000 ppm. The inhibition rate of bacteria is over 50%, preferably over 80%, and more preferably over 95%. The ultrathin glass with anti-microbial function can be applied to medical equipments such as computers or screens used in hospitals.

Antimicrobial function can also be added to a flexible glass which already has AG function by ion-exchange of Ag ion or Cu ion into AG ultrathin glass. AG function can also be added to a flexible glass which already has antimicrobial function by sand blasting or chemical etching or thermal molding. The said functionalized ultrathin flexible glass can be coated with non-ITO coating to realize multi-function integration.

Either toughened or untoughened ultrathin chemical toughenable glass can be laminated with polymer materials to form a protective film. The said polymer material is selected from the group consisting of a silicone polymer, a sol-gel polymer, polycarbonate (PC), polyethersulphone, polyacrylate, polyimide (PI), an inorganic silica/polymer hybrid, a cycloolefin copolymer, a silicone resin, polyethylene, polypropylenepolyvinyl chloride, polystyrene, styrene-acrylonitrile copolymer, polymethyl methacrylate (PMMA), ethylene-vinyl acetate copolymer, polyethylene terephthalate (PET), polybutylene terephthalate, polyamide, polyacetal, polyphenyleneoxide, polyphenylenesulfide or polyurethane, or mixtures thereof. The lamination of an ultrathin glass and a polymer has a thickness less than 500 μm, preferred less than 100 μm, more preferred less than 50 μm and most preferred less than 25 μm. The ratio of thickness of a polymer material to that of a glass is less than 200%, and preferred less than 100%, and in some cases more preferred less than 50%, and even more preferred less than 20%, and in very special cases less than 10%.

The laminate can overcome the drawbacks of common polymer materials which have a very high water vapor transmission rate (WVTR). The WVTR of common polymer materials is 1~10 g/m2/day, while the electronics such as OLED require the substrate to have a WVTR less than 10−5 g/m2/day. Surprisingly, the flexible laminate has a WVTR of less than 5×10−6 g/m2/day that can easily fulfill that requirement. In addition, the polymer layer of the laminate can provide some functions that the glass does not have, such as, adhesive ability or color filter function or polarizer function.

In one embodiment, there is a de-bonding-layer between the glass and polymer material. The de-bonding-layer has weak bonding between itself and the polymer material or the glass sheet, which makes the polymer material or glass to release easily.

During practical use the CTE difference between glass and polymer would cause warp or deformation of the laminate. In one embodiment, both sides of glass are laminated with polymer materials to form a polymer-glass-polymer triply structure, which has better behavior under thermal conditions.

The lamination method includes direct laminating an ultrathin sheet with a polymer material film or foil, with or without adhesives. The other lamination method comprises covering an ultrathin glass with liquid so as to form a polymer precursor first, then curing the material with UV or a thermal method. The polymer precursor is covered on glass with methods including dip-coating, spin-coating, ink-jet, casting, screen printing, painting, and spaying. The finished laminate has an adjustable transmittance from 0% to 90%.

The lamination can be applied as flexible universal substrates for electronic devices such as touch sensors and thin film batteries and displays and solar cells. In one embodiment, the ultrathin borosilicate glass laminated with polyimide (PI) has good flexibility, good optical transmission (~90% for visual wavelength region) and has high temperature stability, and can endure high temperature (300° C.) processing in the practice.

Nowadays, even cover glass on a cell phone is ultra strong and scratch resistant, many people would apply a protective film on the screen just to keep the gadget intact. In most cases the protective film used is plastic made of polymers that are softer and much easier to get scratched and have worse optical transmission which decreases the visual quality of screen. In addition, the touch experience on plastic films is not as good as glass because of less smoothness and high dynamic friction coefficient. The chemically toughened ultrathin glass sheet, or the laminate of glass and polymer can overcome the drawbacks mentioned above and can be well applied as expendable protective films for screens of cell phones or cameras or gaming gadgets.

Resistance screens are different from capacitive screens and require a force applied to realize touch-control function. As a consequence, the resistance screen is easier to get scratched. The cover material for resistance screens on the market is plastic or untoughened thin glass. Both materials cannot meet the anti-scratch requirements. The toughened ultrathin glass is very suitable as a cover material for resistance screens, because of its high flexibility, anti-scratch and scratch-tolerant properties.

Toughened flexible ultrathin sheets or laminates of glass and polymer can be applied to the surfaces of other objects such as tablets, laptops, TVs, mirrors, windows, aviation widows, furniture, and white home appliances. Among all the applications, the glass sheet is adhered to the object with or without an adhesive media. The adhesion method includes direct laminating, pressing and heating, static electric bonding, laser sealing, or bonding with adhesives such as silicone, resin, instant glue, epoxy adhesive, UV curing adhesive, thermoplastic, hot melt adhesive, OCR, OCA, PSA, latex, etc.

PREFERRED EMBODIMENTS

As starting materials, oxides, hydroxides, carbonates and nitrates, etc. all purchased from Sinopharm Chemical Reagent Co., Ltd., Suzhou, chemical grade, unless otherwise indicated.

Example 1

The glass having the composition according to Example 1 in Table 1 is heated to melt, made into a glass mother sheet of 440×360×0.2 mm3 via down draw, and then cut with a conventional abrasive cutting wheel with more than 200 diamond teeth. The sample is sized to 100×100×0.2 mm3. A total of 40 samples are prepared. Then 20 samples are chemically toughened in 100% $KNO_3$ for 15 hours at 430° C. The rest of 20 samples are not chemically toughened as the reference. After ion exchange, the toughened samples are cleaned and measured with FSM 6000. The results show that the average CS is 122 MPa, and the DoL is 14 μm.

The strength of glass is measured by a three-point bending test. In the test the glass sample is horizontally placed on two parallel rigid metal rods, and a loading metal rod is provided above the glass to press downwards the glass until breakage occurs in the glass. The three-point bending result shows that the glass has a bending strength as high as 147 MPa, and can reach a bending radius of 45 mm without breakage. The (bending) strength of untoughened samples is much lower, around 86 MPa, and the bending radius is near 100 mm. The flexibility is greatly enhanced after chemical toughening and the glass are less likely broken during handling.

The commercial soda-lime glasses on the market having the composition shown in Table 5 with the same thickness of 0.2 mm are also prepared and the bending radius before chemical toughening is around 160 mm. The soda lime glass has lower flexibility compared to Example 1 because boron decreases the rigidity of glass. Also, the soda lime glass has low thermal shock resistance (R<159 W/m), causing breakage during chemical toughening with a yield rate of generally less than 50%. The yielding rate of chemical toughening of samples with the composition according to Example 1 in Table 1 is higher than 95% due to the excellent thermal shock resistance and temperature difference resistance.

Example 2

The glass with the composition according to Example 2 in Table 1 is heated to melt, made into a glass mother sheet of 440 mm×360 mm with a thickness of 0.1 mm via down draw, and then cut with a conventional diamond tip. The sample is sized to 50×50 mm2. A total of 120 samples are prepared. Then 100 samples are chemically toughened in 100% $KNO_3$ under different conditions. The rest of 20 samples are not chemically toughened.

Figure 2:
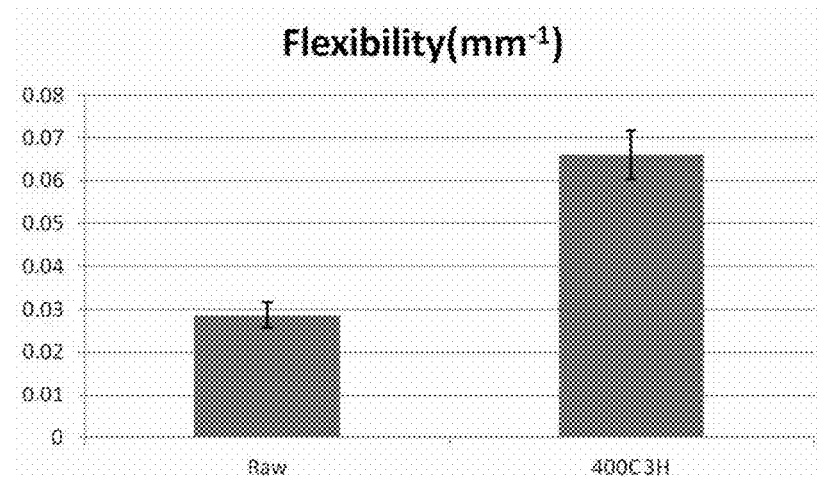
FIG. 2 shows the improvement in flexibility of the ultrathin glass after chemical toughening.
Figure 3:
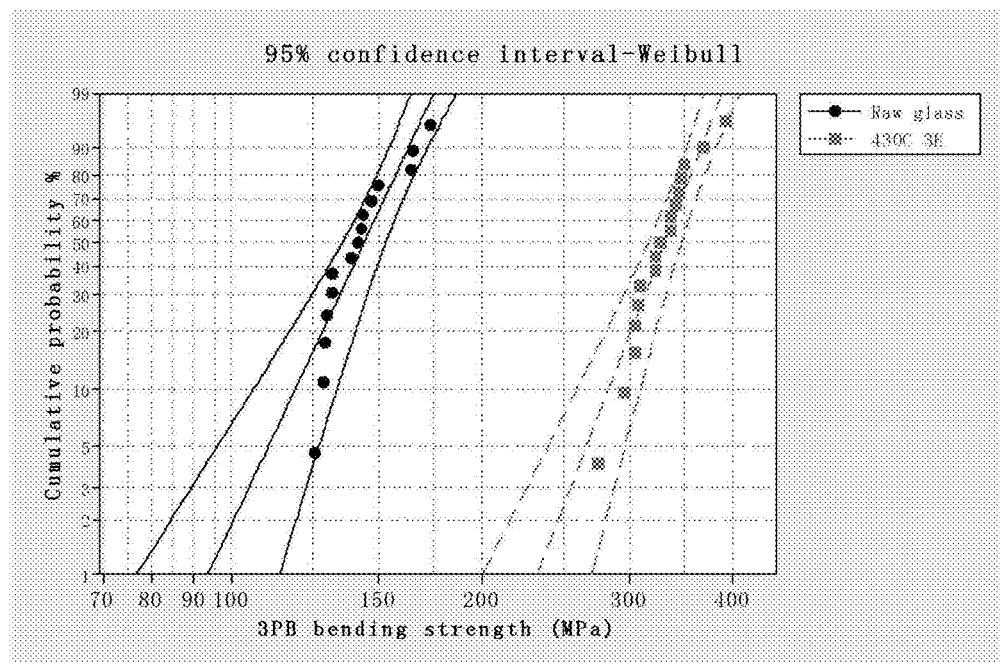
FIG. 3 shows the improvement in Weibull distribution of the ultrathin glass after chemical toughening.

After toughening, the ion-exchanged glass samples are washed and their CS and DoL are measured with FSM 6000. The CS and DoL are shown in FIG. 1. The mechanical strength of these samples is tested with the three-point bending test. As shown in FIG. 2, the chemically toughened glass has a flexibility increase. The chemically toughened glass also has better Weibull distribution compared with untoughened ones, as shown in FIG. 3. The Weibull distribution shows the sample distribution of toughened glasses and the distribution of untoughened glasses, and it can be found the distribution profiles are more vertical, which indicates that the sample dispersion after toughening is smaller and the quality is more uniform, predicating higher reliability of the glass in practice.

The commercial aluminosilicate glass sample with the composition shown in Table 5 is also prepared for comparison. The thickness of 0.8 mm of the mother glass is reduced to 0.1 mm after polishing and chemical etching, and the glass is cut into a size of 50×50 mm2 to be used for chemical toughening. All the samples are broken during chemical toughening because the CS and DoL are so high (higher than 800 MPa and high than 30 μm, respectively) that self breakage occurs due to high CT (>600 MPa). In fact, the high CS (>700 MPa) and high DoL (>40 μm) for cover glass used in cell phones do not bring strengthening or increase in flexibility for ultrathin glass.

Example 3

The glass with the composition according to Example 8 in Table is heated to melt, made into a glass mother sheet of 440×360×0.3 mm3 via down draw, reduced in thickness by polishing and grinding, and then cut into a size of 250×250× 0.3 mm3 by a diamond cutter to test the resistance to temperature difference. After chemical toughening at 400° C. for 3 hours, the samples are heated in the center of the panel to a defined temperature, and the edges are maintained at room temperature. The difference in temperature between the hot center of the panel and the cool panel edge represents the resistance to temperature difference of the glass when the breakage occurs in less than or equal to 5% of the sample. The samples are recorded that all have a resistance to temperature difference of more than 200 K. Before testing, the samples are abraded with sandpaper with a grain size of 40 to simulate extreme damages which is possible in actual use. This proves adequately that the ultrathin glass has very good reliability.

Example 4

The glass having the composition according to Example 7 in Table 1 is heated to melt, made into a glass mother sheet of 440 mm×360 mm×0.2 mm via down draw, and then cut into a size of 200×200×0.2 mm3 by a diamond cutter to test the resistance to thermal shock. Samples are chemically toughened at 400° C. for 4 hours and then heated in an oven with circulating air, afterwards doused in the center thereof with 50 ml of cold (room temperature) water. The resistance to thermal shock value of glass is the difference in temperature between the hot panel and the cold (room temperature) water, at which breakage occurs in less than or equal to 5% of the sample. The result shows that the samples have a resistance to thermal shock of 150 K. Before being heated, the samples are abraded with sandpaper of a grain size of 220 to simulate the typical state of the surface in practical use. This proves adequately that the ultrathin glass has very good reliability.

Example 5

The glass having the composition according to Example 6 in Table 1 is heated to melt, made into a glass mother sheet of 440 mm×360 mm×0.2 mm via down draw, and then cut into a size of 150×150×0.2 mm3 by a diamond cutter. Then the samples are chemically toughened at 430° C. for 4 hours.

Then the toughened samples are printed with OCR via screen printing and then applied to a PC board with a thickness of 0.5 mm to form a laminate. After removing bubbles in the interlayer, the laminate is exposed to UV light to cure. The laminate has good mechanical property as well as excellent surface quality, with the tactile impression on touching PC boards being improved.

Another piece of toughened sample was bonded to a commercially available Schott Xensation Cover aluminosilicate cover glass with a thickness of 0.55 mm via static electric bonding. The lamination is free of bubbles and the ultrathin glass is still removable. The cover glass can be protected from being scratched.

Example 6

The glass having the composition according to Example 3 in Table 1 is heated to melt, made into a glass mother sheet of 440 mm×360 mm×0.15 mm via down draw, and then cut into a size of 50×50×0.15 mm3 by a diamond cutter. Then the glass is chemically toughened in a $KNO_3$ salt bath containing 1,000 ppm $AgNO_3$ at 430° C. for 2 hours. After toughening the CS is 400 MPa and the DoL is 15 µm. The Secondary Ion Mass Spectrometer (SIMS) analysis shows that the concentration of Ag ions is 500 ppm on the surface of glass.

The antimicrobial property of the sample is then tested, with growth of *Escherichia coli* and *Staphylococcus aureus* at room temperature with a humidity 90% for 1 week. The result shows that the inhibition rate for both bacteria reach 99%. The antimicrobial ultrathin glass can be applied on the surface of medical devices.

Example 7

The glass having the composition as Example 2 in Table 1 was made by down draw with a size of 440×360×0.1 mm3. Two sets of samples were made, and the first set sample was cut with a diamond tip and the second set sample was made by cutting with a diamond tip. Both sets have a size of 100×100×0.1 mm3.

The samples of the first set are directly laminated with PI and form flexible substrates. The method of lamination is that placing the glass sheet on a platform and casting a PI precursor or solution on the glass sheet with the screen printing. Then the printed glass sheet is heated to a temperature between 200° C. to 350° C. for a time period of more than 1 hour but less than 3.5 hours to cure the PI material thereon. Finally, the lamination is successfully formed after cooling down. The total thickness of the laminate is 0.13 mm that has very good flexibility with a bending radius less than 100 mm. PEDOT/PSS is printed on the glass surface of the laminate to form a conductive circuit. The laminate is suitable for the flexible touch sensor application.

The samples of the second set are chemical toughened in 100% $KNO_3$ salt bath at 400° C. for 3 hours. The CS and DoL are 341 MPa and 14 µm, respectively. After chemical toughening, the glass is also laminated with PI by the same methods for the first set. The laminate is a better flexible substrate with a bending radius less than 80 mm.

Example 8

The glass having the composition as Example 2 in Table 1 is made by down draw with a size of 440×360×0.1 mm3. Then the first set of samples of 20 pcs glasses of the size 50×50×0.1 mm3 are prepared with a diamond cutting wheel, and the second set of samples of 20 pcs glasses of the size 50×50×0.1 mm3 are prepared with a diamond tip, and the third set of samples of 20 pcs glasses of the size 50×50×0.1 mm3 are prepared with filament cutting with a picosecond laser.

10 pcs samples from each set are tested with the three-point bending. The sample cut by a diamond cutting wheel has an average strength of about 110 MPa, while the sample cut by a diamond tip has an average strength about 140 MPa, and the sample cut by filament has an average strength of about 230 MPa with best edge quality.

10 pcs samples from each set have been chemical toughened in 100% $KNO_3$ salt bath at 400° C. for 3 hours. All samples are subjected to treatment under almost the same values of CS (300 MPa) and DoL (18 µm), and then they are all tested with the three-point bending. The toughened sample cut by a diamond cutting wheel has a strength of about 300 MPa, and the toughened sample cut by a diamond tip has a strength of about 330 MPa, and the toughened sample cut by filament cutting has a strength of about 400 MPa. The cutting method has an influence on the strength of samples after being chemical toughened.

TABLE 5

THE PROPERTY OF COMMERCIAL GLASS FOR COMPARISON

| Composition (wt %) | Commercial AS glass | Commercial soda lime glass |
|---|---|---|
| $SiO_2$ | 65.2 | 70 |
| $Al_2O_3$ | 16.8 | 2 |
| $Li_2O$ | 0.01 | — |
| $Na_2O$ | 14.4 | 13 |
| $K_2O$ | 0.02 | 1 |
| MgO | 3.36 | 4 |
| CaO | 0.03 | 10 |
| SnO | 0.18 | — |
| E | 72 GPa | 73 GPa |
| CTE | $8.0 \times 10{-6}/K$ | $9.0 \times 10{-6}/K$ |
| Density | 2.5 g/cm3 | 2.5 g/cm3 |
| λ | 1 W/mK | 1 W/mK |
| σ* | 127 MPa | 131 MPa |
| Cutting method | Diamond cutting wheel | Diamond cutting wheel |
| R | 176 W/m | 159 W/m |
| ΔT | 352° C. | 319° C. |

*It is the strength of glass without chemical toughening; and it is also affected by the cutting method.

What is claimed is:

1. A glass article comprising a chemically toughened flexible ultrathin glass, said glass having a thickness less than 500 μm, a depth of ion exchange layer less than 30 μm achieved by controlling an ion exchange rate, a surface compressive stress between 100 MPa and 700 MPa, and a central tensile stress less than 120 MPa, wherein said thickness, depth of ion exchange layer, surface compressive stress, and central tensile stress meet the following relationship:

$$\frac{0.2t}{L_{DoL}} \leq \frac{\sigma_{CS}}{\sigma_{CT}}$$

wherein said glass is selected from the group consisting of
(A) a lithium aluminosilicate glass having a composition (in wt %) comprising:

| Composition | (wt %) |
|---|---|
| $SiO_2$ | 55-69 |
| $Al_2O_3$ | 18-25 |
| $Li_2O$ | 3-5 |
| $Na_2O + K_2O$ | 0-30 |
| MgO + CaO + SrO + BaO | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

(B) an alkali metal aluminosilicate glass having a composition (in wt %) comprising:

| Composition | (wt %) |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| MgO + CaO + SrO + BaO + ZnO | 0-12 |
| $TiO_2 + ZrO_2$ | 0-10 |
| $P_2O_5$ | 0-8 | and
(C) a low alkali metal aluminosilicate glass having a composition (in wt %) comprising:

| Composition | (wt %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| MgO + CaO + SrO + BaO + ZnO | 5-25 |
| $TiO_2 + ZrO_2$ | 0-10 |
| $P_2O_5$ | 0-5 | wherein said glass has a Young's modulus less than 84 GPa, wherein said glass has a rigidity ε less than 33.5 GPa·cm3/g, and wherein said glass has a bending radius less than 150 mm.

2. The glass article according to claim 1, wherein said ion exchange rate includes chemically toughening in a salt bath between 350-700° C. for 15 minutes to 48 hours.

3. The glass article according to claim 2, wherein said glass either before or after chemical toughening has a property selected from the group consisting of a thermal shock parameter R higher than 190 W/m, a maximum thermal loading ΔT higher than 380° C., a resistance to temperature difference RTG higher than 50 K, a resistance to thermal shock RTS higher than 75 K, a CTE less than $9.5 \times 10^{-6}/K$, and any combinations thereof.

4. The glass article according to claim 1, wherein said lithium aluminosilicate glass has a composition (in wt %) comprising:

| Composition | (wt %) |
|---|---|
| $SiO_2$ | 57-66 |
| $Al_2O_3$ | 18-23 |
| $Li_2O$ | 3-5 |
| $Na_2O + K_2O$ | 3-25 |
| MgO + CaO + SrO + BaO | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2. |

5. The glass article according to claim 1, wherein said lithium aluminosilicate glass has a composition (in wt %) comprising:

| Composition | (wt %) |
|---|---|
| $SiO_2$ | 57-63 |
| $Al_2O_3$ | 18-22 |
| $Li_2O$ | 3.5-5 |
| $Na_2O + K_2O$ | 5-20 |
| MgO + CaO + SrO + BaO | 0-5 |
| ZnO | 0-3 |
| $TiO_2$ | 0-3 |

-continued

| Composition | (wt %) |
|---|---|
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2. |

6. The glass article according to claim 1, wherein said alkali metal aluminosilicate glass has a composition (in wt %) comprising:

| Composition | (wt %) |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9. |

7. The glass article according to claim 1, wherein said alkali metal aluminosilicate glass has a composition (in wt %) comprising:

| Composition | (wt %) |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8. |

8. The glass article according to claim 1, wherein said low alkali metal aluminosilicate glass has a composition (in wt %) comprising:

| Composition | (wt %) |
|---|---|
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5. |

9. The glass article according to claim 1, wherein said low alkali metal aluminosilicate glass has a composition (in wt %) comprising:

| Composition | (wt %) |
|---|---|
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5. |

10. The glass article according to claim 1, wherein said glass has a surface roughness less than 5 nm.

11. The glass article according to claim 1, wherein said glass is glass sheet having a size that is greater than 100×100 $mm^2$.

12. The glass article according to claim 1, wherein said glass is a glass roll, said glass roll having a width greater than 250 mm and a spreading length is greater than 1 m.

13. The glass article according to claim 1, further comprising a bendable non-ITO conductive coating with a thickness between 0.001 μm and 100 μm thereon such that the glass article is a conductive glass article.

14. The glass article according to claim 13, wherein the conductive coating comprises a material selected from the group consisting of silver nano-wires, carbon nano-tubes, graphenes, poly(3,4-ethylenedioxythiophene)/poly(styrenesulfonate) (PEDOT/PSS), polyacetylene, polyphenylene vinylene, polypyrrole, polythiophene, polyaniline, polyphenylene sulfide, and any mixtures thereof.

15. The glass article according to claim 13, wherein the conductive coating has a Young's modulus less than or equal to 50 GPa, and wherein the glass article comprises an adjustable transmittance of 0-90%.

16. The glass article according to claim 13, wherein the conductive coating has a sheet electric resistance less than 300 Ω/sq.

17. The glass article according to claim 1, further comprising at least one surface treated to provide an anti-glare function such that the glass article is an anti-glare glass article.

18. The glass article according to claim 1, further comprising at least one surface comprising Ag+ or Cu2+ ions such that the glass article is an anti-microbial glass article.

19. The glass article according to claim 18, wherein the Ag+ or Cu2+ ions on the at least one surface have a concentration above 1 ppm.

20. The glass article according to claim 1, wherein said glass before or after ion exchange comprises a laminate with a polymer material.

21. The glass article according to claim 20, wherein said laminate has a WVTR of less than $5 \times 10^{-6}$ g/m2/day.

22. The glass article according to claim 20, wherein said polymer material is selected from the group consisting of silicone polymer, sol-gel polymer, polycarbonate (PC), polyethersulphone, polyacrylate, polyimide (PI), cycloolefin copolymer, polyarylate, silicone resin, polyethylene, polypropylenepolyvinyl chloride, polystyrene, styrene-acrylonitrile copolymers, polymethyl methacrylate (PMMA), ethylene-vinyl acetate copolymers, polyethylene terephthalate (PET), polybutylene terephthalate, polyamide, polyacetal, polyphenyleneoxide, polyphenylenesulfide or polyurethanes, and any mixtures thereof.

23. The glass article according to claim 20, wherein said laminate has a total thickness of less than 500 μm.

24. The glass article according to claim 20, wherein said laminate has a ratio of said polymer materials to said glass of less than 200%.

25. The glass article according to claim 1, wherein the glass article is configured for a use selected from the group consisting of a protective film for a resistive screen, a display screen, a cell phone, a laptop, a TV, a mirror, a window, an aviation widow, furniture, and a white home appliance.

* * * * *